United States Patent [19]

Heaney

[11] 4,051,039
[45] Sept. 27, 1977

[54] ACTIVATED SEWAGE PLANT AND PROCESS

[75] Inventor: Donald F. Heaney, Pittsburgh, Pa.

[73] Assignee: Dravo Corporation, Pittsburgh, Pa.

[21] Appl. No.: 680,421

[22] Filed: Apr. 26, 1976

Related U.S. Application Data

[60] Continuation of Ser. No. 301,262, Oct. 27, 1972, abandoned, which is a division of Ser. No. 2,103, Jan. 12, 1970, Pat. No. 3,713,543, which is a continuation-in-part of Ser. No. 761,616, Sept. 23, 1968, abandoned.

[51] Int. Cl.² .................................................. B01D 23/16
[52] U.S. Cl. ................................. 210/274; 210/279; 210/293
[58] Field of Search .................................. 210/80-82, 210/274–276, 279, 293

[56] References Cited

U.S. PATENT DOCUMENTS

| | | | |
|---|---|---|---|
| 2,559,784 | 7/1951 | Moore | 210/274 X |
| 2,855,364 | 10/1958 | Roberts | 210/274 X |
| 3,428,177 | 2/1969 | Duff | 210/274 X |
| 3,459,302 | 8/1969 | Ross | 210/274 X |
| 3,512,649 | 5/1970 | Nebolsine et al. | 210/274 |
| 3,680,701 | 8/1972 | Holca | 210/80 |

OTHER PUBLICATIONS

Operation and Control of Water Treatment Processes, 1964, Charles R. Cox, pp. 96, 97, 101–108.
Water Supply and Sewerage, 1960, 4th Edition, Ernest W. Steel, p. 544, McGraw-Hill Book Co., Inc.

Primary Examiner—Thomas G. Wyse
Assistant Examiner—Robert H. Spitzer
Attorney, Agent, or Firm—Parmelee, Miller, Welsh & Kratz

[57] ABSTRACT

There is disclosed an activated sewage disposal plant of the compact or so-called "packaged" type and a method of processing sewage wherein a fast filter is provided through which the effluent liquid from the primary processing is passed, provision being made for backwashing the fast-flow filter from time to time with the backwash being collected in a well or vessel from which it is recycled at a controlled rate to the raw sewage. The entire plant can be embodied in a compact package unit, one common type of which comprises two concentric tanks, the outer one of which is divided into several compartments.

3 Claims, 5 Drawing Figures

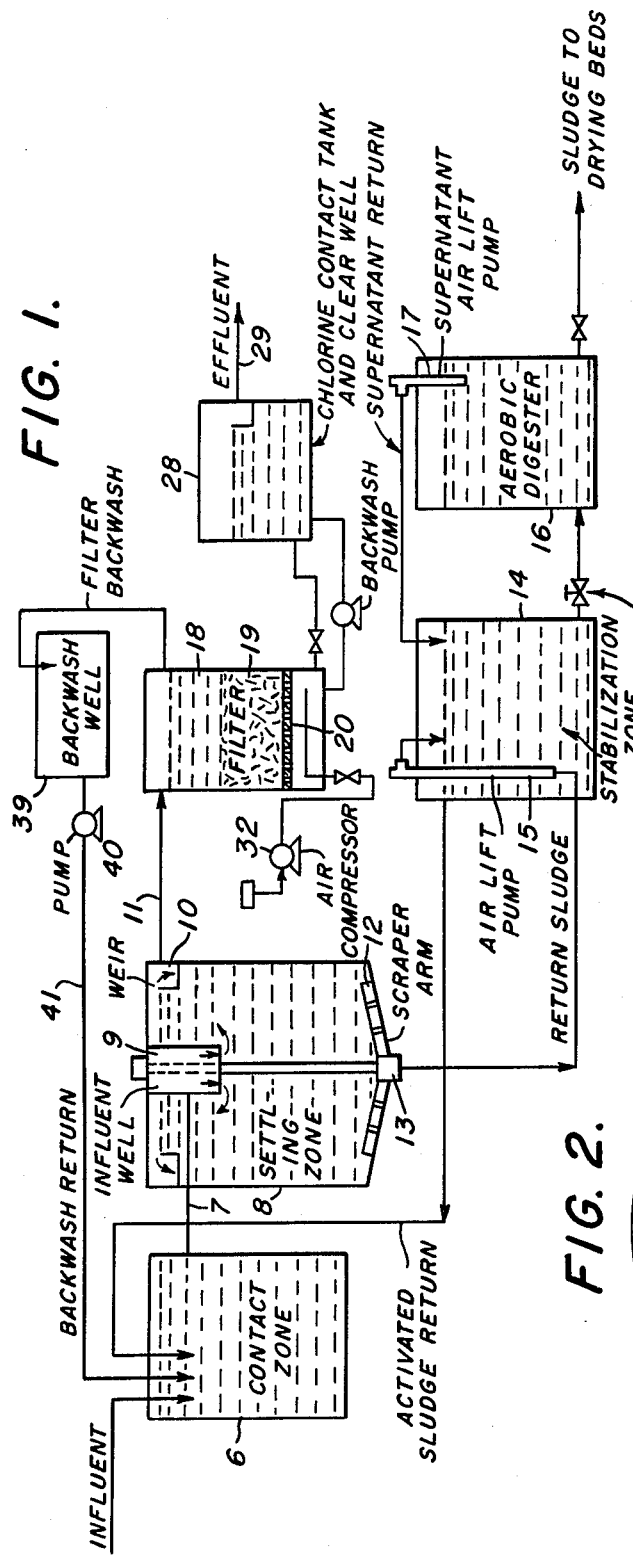
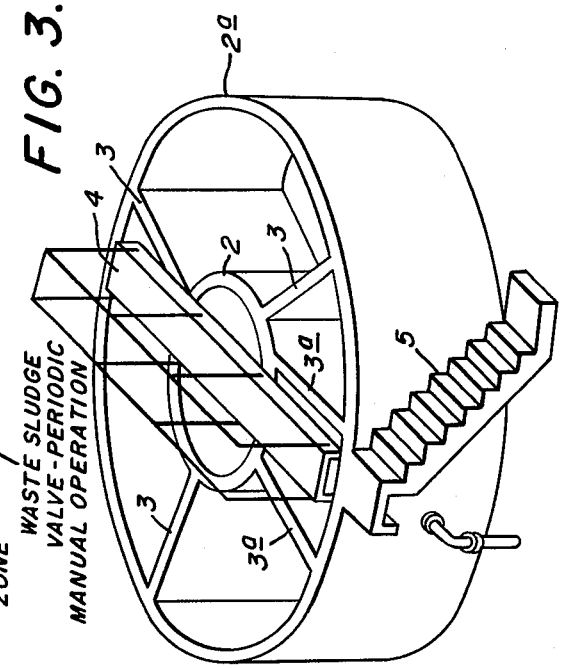
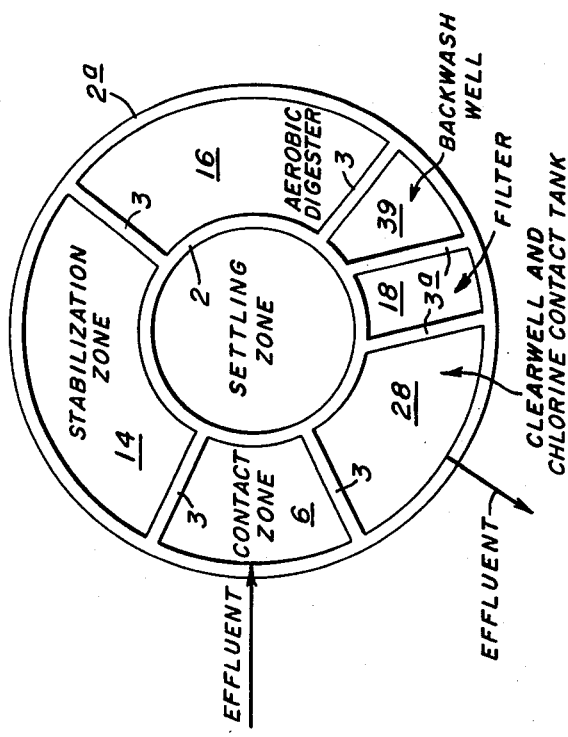

ACTIVATED SEWAGE PLANT AND PROCESS

BACKGROUND OF THE INVENTION

This application is a continuation of Ser. No. 301,262, filed Oct. 27, 1972, now abandoned, which is a division of Ser. No. 2,103, filed Jan. 12, 1970, now U.S. Pat. No. 3,713,543, which is a continuation-in-part of Ser. No. 761,616, filed Sept. 23, 1968, now abandoned.

The invention herein disclosed relates to sewage treatment plants which produce an effluent that is acceptable to modern pollution regulations. The invention is particularly applicable to compact, relatively attractive and odor-free plants acceptable for use in small municipalities, hospitals, shopping centers, housing developments, industrial plants, rather than to large capacity plants of the type required by cities or highly populated urban areas.

Several types of modern compact sewage treatment plants have come into use during the past decade of ever-tightening antipollution controls. The present invention is particularly related to compact plants that are run with a process known as "contact stabilization," wherein activated sludge is used as the secondary treatment. The invention is especially applicable to apparatus wherein a central tank is surrounded by an outer tank divided into several compartments, but is useful in other plants.

In a usual type of activated sewage treatment, sludge which has passed through certain stages of treatment, and free of much of the initial water content, and which is termed "activated sludge" because of its abundance of micro-organisms, is recycled to an initial processing station and mixed with incoming raw sewage. The activated sludge adsorbs suspended nutrients and micro-organisms from the raw sewage. From this contact zone the mixture is passed over into a settling zone or vessel. This is in the nature of a decanter from the top of which clear liquid is removed, while the solids which settle to the bottom are transferred, with much of the liquid, to a stabilizing zone where it is aerated and activated. It is from this zone that some of the now-activated sludge is recirculated to the contact zone. The sludge not needed for recycle to the contact zone is discharged into an aerobic digester where, under aerobic conditions, objectionable micro-organisms are converted into an inert condition. Here it accumulates to be periodically removed, while the water, commonly referred to as "supernatant liquid" is ultimately recycled to the contact zone.

The effluent water from the top of the settling zone which after chlorination has heretofore been considered to be adequately pure for discharge into streams, being 85% to 90% free of B.O.D. (biochemical oxygen demand) and suspended solids, is now no longer permitted to be discharged into surface water without further treatment, either in intermittent filters or stabilization lagoons.

BRIEF SUMMARY OF THE INVENTION

The present invention makes it possible to conform compact systems, including compact systems employing concentric tank ararangements, to present high standards without using lagoons or the usual intermittent filter units presently being demanded for use with compact systems. The present invention therefore enables these compact disposal units to be installed in locations and neighborhoods where plants requiring lagoons or usual filters would not be acceptable, while the effluent liquid is reduced to 98% B.O.D. and 99% free of suspended solids.

This is accomplished through the use of what I term an "in-depth" filter, referred to in my earlier application as a deep bed fast flow filter, through which the effluent liquid from the settling tank flows to the clearwell in which it is collected and chlorinated. Such a filter, to be hereinafter described in detail, is readily adaptable to the geometry of compact units as presently designed. Using two of these filters, alternating from one to the other, the sewage plant can operate continuously, one being used while the other is being backwashed and made ready for use. Backwash water is collected in a backwash well or compartment and returned to the initial contact zone at a metered rate, avoiding the sudden dumping of a volume of backwash water into the plant.

As applied to a compact unit having a central tank with an encircling tank having radially-extending walls, the two indepth filters and backwash well can most simply be provided through the addition of two or more transverse walls across the outer of the two concentric tanks, and simply by increasing the diameter of the outer wall of the outside tank, that is, the distance between the inner and outer walls, the capacity of the various compartments in the outer tank can still be as great as they were before the inclusion of the two additional compartments, as will be hereinafter more fully apparent.

An important object of this invention is to provide a novel method of and apparatus for treating raw sewage to meet the increasingly tight anti-pollution requirements in an economic manner and with relatively low plant expense and investment compared to apparatus heretofore proposed.

U.S. Pat. No. 3,425,936 discloses a sewage plant in which a filter is proposed to be used in place of a lagoon, but the filter there disclosed requires a multiple tube settling device in advance of the filter, and as a result the operation of the plant must be intermittent.

This and other objects and advantages are secured by the invention as more fully described in connection with the accompanying drawings, wherein:

FIG. 1 illustrates schematically a flow diagram for a plant embodying the invention and illustrating the process;

FIG. 2 is a schematic plan view of a sewage treatment plant showing a preferred arrangement of the present invention;

FIG. 3 is a schematic perspective view illustrating a typical overall concept of a compact plant constructed to embody the invention;

Figure 4:
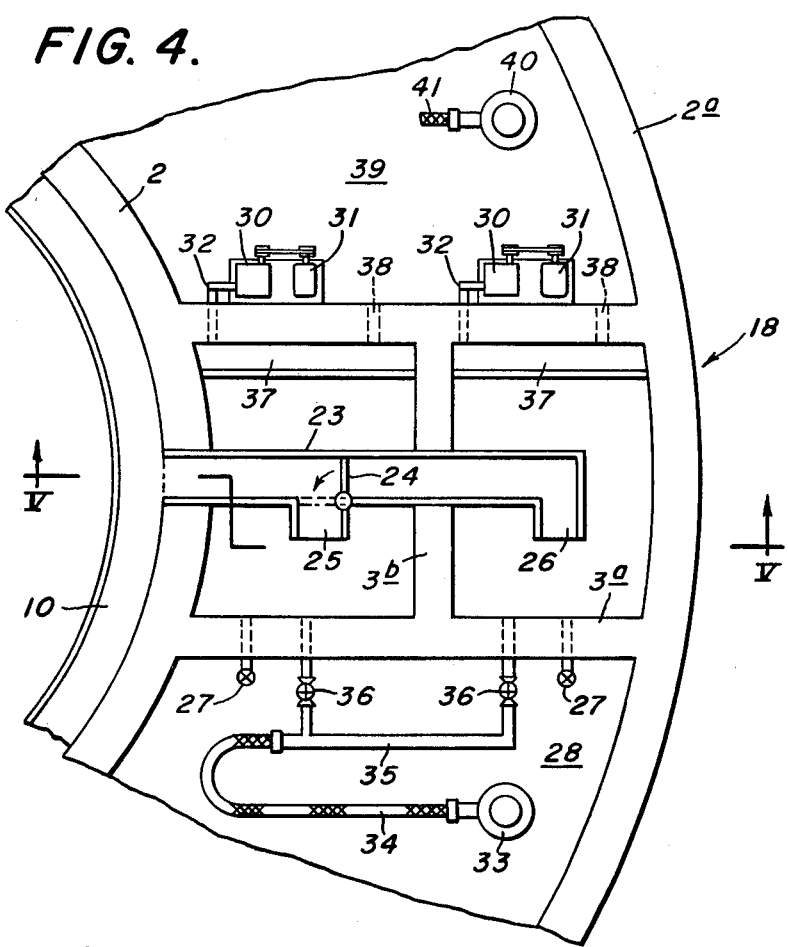
FIG. 4 is a fragmentary plan view of a modified plant similar to FIG. 2 but showing on a larger scale a dual filter arrangement.

As previously pointed out, the present invention is preferably adapted to a compact or so-called "packaged" type of treatment plant designed for installation by small municipalities, hospitals, shopping centers and the like, where the sewage output does not substantially exceed approximately 2 million gallons per day. One typical design here shown has concentric inner and outer watertight walls 2 and 2a, providing two tanks with a common wall between them, and it is supported on an adequate foundation. There are a number of transverse partitions 3 between the inner and outer walls, providing in the outer tank a number of zones or compartments. Preferably, but not always, the structure is circular as being most economical, and at the same time architecturally most acceptable. A bridge 4 extends across the top of the structure and is provided to allow the operators to maintain the equipment and perform such operations as are needed for the functioning of the plant. An access stair is indicated at 5.

According to the present invention, two transverse partitions 3a are provided in addition to the compartments heretofore formed by the partitions 3 for the purpose hereinafter more fully explained.

Referring now to FIG. 1, which is a flow diagram, in conjunction with FIG. 2, it may be explained that the inflowing raw sewage may have first been passed through a comminuter or bar screen (not shown) to reduce or remove large solids. The influent material first enters an aerated zone 6, known as the "contact zone." Here it is mixed with activated or partly processed sludge from a succeeding zone in the system. The activated sludge introduced into the contact zone is rich in microorganisms, and the solids are in the nature of a floc which is highly active in adsorbing colloidal and suspended matter in the raw sewage. This adsorption occurs quickly, and the mixed liquor passes through duct 7 into a settling zone 8 through a well 9. This influent well eliminates surface turbulence by distributing the influx below the surface of the liquid in the tank. The mixed liquor remains in the settling zone where the solids settle to the bottom. The liquid flows over an annular weir 10 into an outlet conduit 11.

The sediment at the bottom of the settling tank is raked in the usual manner by a slowly-revolving rake 12 into a central hopper 13. From here it is transferred along with considerable water into the top of zone or compartment 14 by an air-lift pump, indicated at 15.

In zone 14, known as the "stabilizing zone," the sludge is actively aerated. The air is released at or near the bottom of this compartment by non-clogging nozzles preferably as a succession of bubbles. U.S. Pat. No. 3,182,978 shows a suitable device for this purpose. Here a continuous supply of activated sludge is provided for recycle to the contact zone 6. There will, however, be a continuous influx of sludge, and some of it will be transferred from time to time into zone or compartment 16 designated as the aerobic digester, where the organic material is biologically decomposed in an oxidizing atmosphere into inert, odorless, inoffensive residue, while the supernatant liquid from the digester is returned through pump 17 to the stabilization zone, and eventually into the overflow weir 10.

The process and apparatus just described is known in the art, as is the concentric arrangement of the tanks with the inner tank being the settling tank or zone 8 surrounded by the contact zone 6, the stabilization zone 14, and the digester compartment 16.

The clarified liquid that overflows into the weir 10 of the settling zone and is removed at 11 is at least 85% free of the B.O.D. and suspended solids contained in the raw sewage, and as previously explained, the 10% to 15% remaining in the clarified liquid was formerly considered unobjectionable and could be discharged after chlorination into surface streams.

Figure 5:
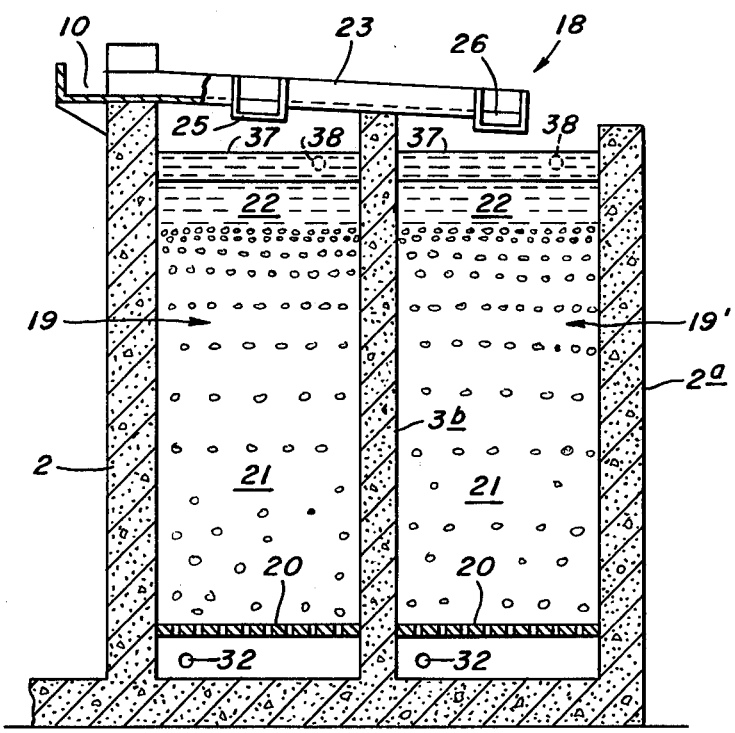
FIG. 5 is a vertical section in the plane of line V—V of FIG. 4.

According to this invention there is a filter unit, designated generally as 18, which is especially developed for this purpose, and is termed by me as an "in-depth" filter. Actually as here shown the unit 18 comprises two complete filters 19 and 19'. These may be seen in FIGS. 4 and 5. Each has an air-pervious reticulated false bottom 20 on which is supported the filtering bed 21. In a typical plant, designed for 200,000 gallons of raw sewage per day, or about 140 gallons per minute, each filter, formed betweem radially-extending but parallel walls 3a and having a common partition wall 3b, has an area of about 70 square feet. Above the reticulated false bottom the filter bed is at least six feet deep. The filter bed 21 is comprised of a gravel-like coarse sand, the individual grains of which have rounded non-angular surfaces. Hard rounded—but not necessarily spherical—quartz sand particles ranging between 1 mm and 3mm maximum diameter are most useful, and preferably most of the particles in a bed do not vary from one another by more than 1 mm. In other words, while the range is 1 mm to 3 mm. the bed is preferably made up of particles mostly in the 1 mm to 2 mm size or the 2 mm to 3 mm size. Under gravity flow the filter will take care of about 2 gallons of effluent per square foot per minute.

Above each filter bed there is a head space 22 into which the liquid from the settling tank is discharged. In the drawing there is shown a trough or sluice 23 leading from the overflow weir 10 of the settling chamber over the tops of the filters 19 and 19'. There is a gate or other valving means 24 movable from the full line position shown in FIG. 4 where all of the flow is directed over discharge duct 25 into filter 19 to the dotted line position where all of the flow is directed over duct 26 into the top of filter 19'.

Each filter 19 and 19' has a valved outlet 27 leading from the space below the false bottom 20 into the bottom of the adjacent clearwell and chlorine contact tank 28. This compartment has an effluent discharge outlet duct indicated by arrow 29 at a level above the bottom of the tank but below the top of the filter beds 21, so that there is normally filtered liquid flowing into the bottom of the clearwell and rising to the level of the outlet 29. This upwardly-flowing body of liquid is chlorinated in the conventional manner, the chlorinating apparatus not being shown.

This body of chlorinated water in the clearwell also provides an accumulation of clean water for backwashing the filter. Each filter is provided with an air compressor 30 driven by a motor 31 and with an air discharge pipe 32 leading downwardly and opening into the space below the perforate false bottom 20. Also, there is a sump type pump 33 in the clearwell 28 with a hose 34 leading to a manifold 35 with two valved outlets 36 so that water in the clearwell may be selectively forced under pressure through one or the other of the outlets 36 into the space under the false bottom of either filter 19 or filter 19'.

Each filter has an overflow weir 37 at the top of space 22, each weir having a discharge passage 38 opening into a compartment or zone 39 which is a backwash well. When the filter is being backwashed, water flowing upwardly through the bed overflows into one of the weirs 37 and drains into the backwash well. The backwash water, with solids and substances which it removes from the filter bed, is then returned at a regulated or metered rate by means of a pump 40 and backwash return line 41 to the contact zone 6. By collecting the backwash in a separate well and returning it by a motor-driven pump, the backwash water is recycled in an amount and at a time when it will not produce any surge through the plant or introduce an excessive amount of the backwash water which has been chlorinated into the contact zone where the action of the activated sludge should not be impaired.

In a typical plant, such as the one above described of a 200,000 G.P.D. capacity, each of the special filter units will normally operate continuously for 2 or 3 days. A rise in liquid level in the head space 22 of the filter in use will indicate that its filtering rate is dropping and that it should be backwashed. Contrary to expectation, the non-angular sand or gravel particles are highly efficient in trapping small particles in the sewage and efecting its agglomeration into larger fragments or masses, possibly due to some presently unclearly understood adsorption or other surface phenomenon.

Backwashing can be effected in relatively short periods of time. In a plant such as that above mentioned, air alone is back-flushed through the filter medium for about a minute. Then water supplied from pump 33 and air together are used, but the air serves principally to loosen or dislodge the solids from the filtering medium while the water is supplied as a vehicle to carry it into the backwash overflow weirs. Because of the non-angular character of the filter bed, particles roll one upon another under the rising air currents, loosening the deposited material and providing clearance for the water to float such deposits to the top of the bed. In the typical filter above described there are used about seven cubic feet of air per minute at 8 P.S.I. under the false bottom for each square foot of filter area, while about 8 gallons of water per square foot per minute are used in backwashing, so that it will be seen that the air is a significant factor in loosening and agitating the bed and the water is a buoyant fluid for the sand and vehicle to carry away foreign solids.

It is important that the filter bed be of non-angular particles—that is rounded to avoid flat faces or angular corners or edges. It is important that they be hard, either of quartz or some artificial ceramic, since other materials fracture and small fragments and detritus is produced which tends to clog the bed or produce "mud-balling" in which the solids filtered from the effluent form into balls which stay in the bed.

With two filters, one may be in service while the other is backwashing, or has been backwashed and is made ready for use. It will of course be understood that when a filter is being backwasheed the valved passage 27 must be closed, and is opened only when the filter is functioning. The deep-bed filter as here described does not require any preliminary settling or separating apparatus that must be cleaned when the filter is backwashed, as is the case with some filters.

The partitions 3a which have been added to the outer of the conventional two tank arrangements, provide for the filter and backwash well, while still leaving the other compartments in their respective positions.

Added capacity can be provided where necessary because of the inclusion of these two compartments simply by increasing the radius of the outer wall, the geometry providing a considerable increase in cubical capacity with a relatively small increase in diameter, so that the appearance and architecture of the plant is not altered or detracted from in any way, and a much more efficient plant is provided in the same type of "package" with relatively small increase in cost. At the same time the addition requires little change in the basic engineering and accessory equipment.

I claim:

1. A filter especially designed for use in filtering the effluent flowing from the settling tank of an activated sewage plant to a clearwell and chlorinating vessel having an effluent discharge comprising:
    a. a vessel having a bottom and side walls and having a perforate false bottom spaced above the bottom,
    b. a filter bed not less than 6 feet in depth supported on said false bottom and comprised of hard gravel-like quartz sand, the particles of which are rounded and non-angular and in the general size ranging between 1 mm and 3 mm in the greatest dimension and with the particles in the bed predominantly varying from one another but not substantially more than 1 mm, said filter having a valved discharge outlet from the space below the false bottom for the collection of filtered water, said filter having means for forcing air under pressure into the space under the false bottom when said valved outlet is closed, said filter having means for forcing backwash water into the space under the false bottom when air is also being forced into said space, said filter having a head space above the filter bed for receiving water to be filtered and having an overflow weir into which water flows when the water is being backwashed.

2. The filter defined in claim 1 in which the filter has an area providing 1 square foot for each 2 gallons per minute of effluent to be processed and is capable of reducing the B.O.D. of effluent liquid from the settling tank of an activated sewage plant to 98% and render it 99% free of suspended solids.

3. The filter defined in claim 2 in which said means for forcing air under pressure to the space under the false bottom comprises a compressor capable of supplying at least 7 cubic feet of air per minute at 8 pounds per square inch per square foot of filter bed area, and said means for forcing backwash water into the space under the false bottom comprises a pump which delivers at least 8 gallons per minute per square foot of filter bed area.

* * * * *